United States Patent Office 3,481,181
Patented Dec. 2, 1969

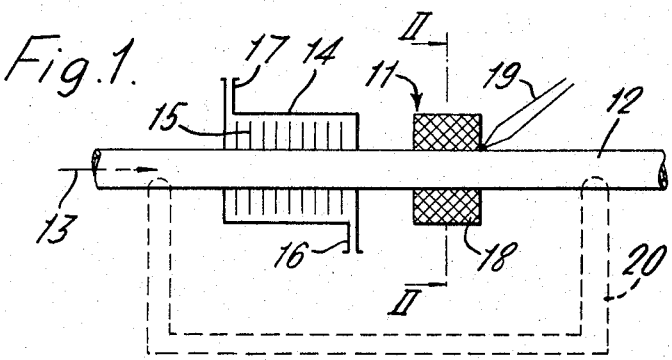
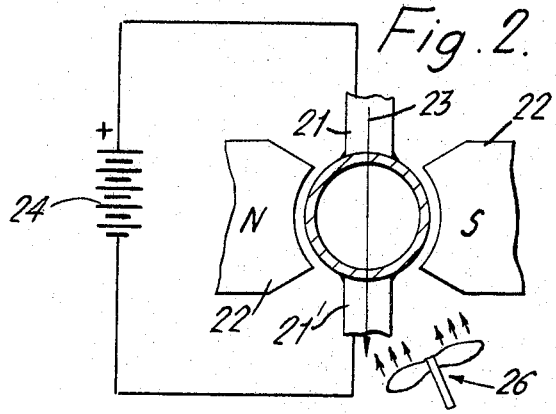
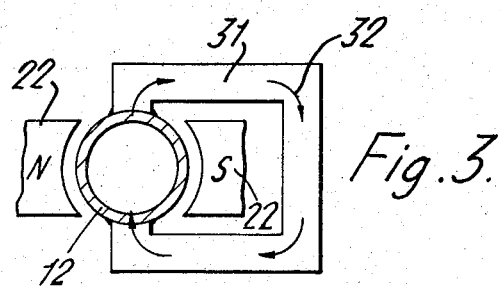

3,481,181
LIQUID METAL MONITOR
Peter Francis Roach, Warrington, England, assignor to United Kingdom Atomic Energy Authority, London, England
Filed June 2, 1967, Ser. No. 643,268
Claims priority, application Great Britain, June 15, 1966, 26,762/66
Int. Cl. G01n 11/00, 25/02
U.S. Cl. 73—61  3 Claims

ABSTRACT OF THE DISCLOSURE

An apparatus for indicating the saturation temperature of a flowing metal including a heat exchanger, an electromagnetic pump and a thermocouple. The flow of the metal is reduced due to the opposing effect of the electromagnetic pump and the metal will plate out at the coolest point in the heat exchanger. As the metal plates out the effect of the pump is reduced and the flow of metal increases and begins to dissolve the plated out metal. The operation will continue to alternate between increased and decreased flow until a steady state is reached wherein the metal is neither plated out nor dissolved. The thermocouple will then give a measurement of the saturation temperature.

---

This invention relates to apparatus for monitoring a flowing liquid metal for impurities.

Previously such monitors utilised some form of orifice mounted in the liquid metal flow stream. Progressive cooling of the stream prior to its passage through the orifice eventually results in blockage of the orifice (to a greater or lesser extent) by impurities precipitated from the stream as its temperature falls. Flow changes resulting from this blockage are detectable and, on occurring, indicate that the temperature of the liquid metal near the orifice is in the region of saturation temperature for the impurity concentration in the liquid. This saturation temperature can be compared with a relationship showing sobubility of impurity in the liquid metal and so the proportion of impurity present in the liquid metal can be determined. Certain practical problems arise both in the accurate determination of the saturation temperature and in the usage of orifices which can be inadvertently blocked.

According to the present invention apparatus for monitoring a flowing liquid metal for soluble impurities comprises a duct defining a flow path for the liquid metal, heat exchange means associated with the duct for cooling liquid metal therein, first and second electrodes mounted in opposed relationship in the duct wall downstream of the heat exchange means for defining in the duct wall between said electrodes an electric current conducting path exposed to liquid metal flowing in said duct, associated with said electrode means for generating, on the passage of an electric current along said conducting path, an electromagnetic field acting to resist flow of liquid metal along the duct, and means for determining the temperature of liquid metal in the flow path in the region of said electrodes.

Examples of embodiments of the invention will now be described with reference to the accompanying diagrammatic drawings, wherein:

FIGURE 1 is a side view in medial section,
FIGURE 2 is an end view in section on line II—II of FIGURE 1, and
FIGURE 3 is a similar view to that of FIGURE 2 and illustrates an alternative construction.

FIGURE 1 shows a liquid metal monitor 11 comprising a liquid metal duct 12 through which a liquid metal such as sodium can be pumped by means (not shown) in the direction of arrow 13. A part of the duct 12 is surrounded by a heat exchanger in the form of an air cooler 14 whereby cooling air can be passed across fins 15 provided on the said part of the duct 12 by way of inlet 16 and outlet 17. Downstream of the cooler there is provided an electromagnetic induction pump 18 which is of a type requiring the passage of current through the duct wall. A thermocouple 19 is provided on the downstream side of the pump 18. Referring now to FIGURE 2, electrodes 21, 21' of pump 18 are brazed to the walls of the duct 12 in opposed relationship. Magnetic poles 22 providing the magnetic field for pump 18 are mounted at right angles both to duct 12 and to the electrodes 21, 21'. Current from a direct current source denoted 24 can be passed through electrodes 21, 21' in the direction of arrow 23. A bypass line 20 (FIGURE 1) provides that the flow through the monitor 11 is easily changed by the induction pump 18 regardless of the value of source impedance.

In operation, liquid metal is pumped along the duct 12 in the direction of arrow 13, being cooled by the air cooler 14. On passing a direct current through the electrodes 21, 21' in the direction of arrow 23 an electromagnetic force is induced in the liquid metal in the duct in the region of the electrodes in a direction (as can be determined by Flemings "Motor" Rule) opposed to that of the flow of liquid metal. The liquid metal flow is thereby reduced to a smaller value. Precipitated impurity will begin to plate out of the liquid metal onto the duct wall at the coolest point near the pump. If necessary a secondary coolant flow of air can be directed to cool the main wall under the electrodes 21, 21'. Such a flow of air may be produced by a secondary heat exchange means, indiciated schematically by element 26 in FIGURE 2, associated with duct 12 in the region of electrodes 21 and 21' and in a heat exchange relationship with liquid metal flow in duct 12 for cooling the liquid metal in the region of the electrodes. As plating out of impurity continues, the current across the electrodes 21, 21' will be reduced due to increased electrical resistance offered by the plated out impurity. As a consequence the force opposing flow is reduced and the liquid metal flow increases. With air flowing through the cooler 14 at a fixed rate the increased liquid metal flow results in an increased amount of heat being carried into the region of the electrodes so that the plated-out impurity tends to re-dissolve.

Flow and temperature conditions in the monitor 11 will undergo a damped oscillation until the conditions are such that impurity is being neither plated out nor re-dissolved and the temperature, measured by thermocouple 19, will then indicate the saturation temperature as previously described. The output of the thermocouple also serves to indicate the progress of the flow and temperature conditions towards a steady value.

The action of the electromagnetic pump 18 can also be achieved by the use of an eddy current brake as shown in FIGURE 3. Here a single copper turn 31 is brazed to the walls of the main 12 (in place of electrodes 21, 21' of FIGURE 2). In use the flow of liquid metal through the magnetic field provided by pole pieces 22 causes a current to be induced in the copper turn 31 in a direction (which can be determined from Flemings "Dynamo" Rule) shown by arrow 32. This current will cause a force thereafter to resist further flow in the duct 12 in the manner of an eddy current brake.

Monitors according to the invention dispense with any form of orifice situated in the fluid flow which can be inadvertently blocked. It also provides monitors which are self stabilising in operation without a need for elaborate feed-back control mechanisms.

I claim:
1. Apparatus for monitoring a flowing liquid metal for soluble impurities comprising a duct defining a flow path with the duct for cooling liquid metal therein, first and second electrodes mounted in opposed relationship in the duct wall downstream of the heat exchange means for defining in the duct wall between said electrodes an electric current conducting path exposed to liquid metal flowing in said duct, means for applying a direct current between said electrodes along said current conducting paths, means for generating a constant electromagnetic field across the duct perpendicular to both the direction of liquid metal flow in the duct and to the direction of current flow for acting to resist flow of liquid metal along the duct, and means for determining the temperature of liquid metal in the flow path in the region of said electrodes.

2. Apparatus according to claim 1, comprising a secondary heat exchange means associated with the duct means in the region of said electrodes, and in heat exchange relationship with liquid metal flow in said duct for cooling liquid metal in the region of said electrodes.

3. Apparatus according to claim 1, wherein the means for applying a direct current comprises a closed conductor linking the electrodes outside the duct to provide an eddy current brake operating so that the flow of liquid metal in the duct generates said electromagnetic field acting to resist said flow.

References Cited

UNITED STATES PATENTS 2,782,369   2/1957   Werner et al.

LOUIS R. PRINCE, Primary Examiner

J. W. ROSKOS, Assistant Examiner

U.S. Cl. X.R.

73—17